United States Patent
Gao et al.

(10) Patent No.: US 9,734,229 B1
(45) Date of Patent: Aug. 15, 2017

(54) SYSTEMS AND METHODS FOR MINING DATA IN A DATA WAREHOUSE

(71) Applicant: Symantec Corporation, Mountain View, CA (US)

(72) Inventors: Biao Gao, Sichuan (CN); George Chassiakos, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 262 days.

(21) Appl. No.: 14/023,058

(22) Filed: Sep. 10, 2013

(51) Int. Cl.
*G06F 17/30* (2006.01)

(52) U.S. Cl.
CPC .. *G06F 17/30592* (2013.01); *G06F 17/30572* (2013.01)

(58) Field of Classification Search
CPC .. G06F 17/30539; G06F 19/24; G06F 19/707; G06F 17/30592; G06F 17/30339; G06F 17/30563; G06F 17/30498; G06F 17/30466; G06F 17/30572
See application file for complete search history.

(56) References Cited

U.S. PATENT DOCUMENTS

| | | | |
|---|---|---|---|
| 5,724,573 A * | 3/1998 | Agrawal et al. | |
| 5,813,003 A * | 9/1998 | Chen et al. | |
| 6,061,682 A * | 5/2000 | Agrawal et al. | 707/694 |
| 6,360,217 B1 * | 3/2002 | Gopal et al. | |
| 6,957,225 B1 * | 10/2005 | Zait | G06F 17/30333 707/999.102 |
| 7,370,033 B1 * | 5/2008 | Roychowdhury | G06F 17/30592 707/958 |
| 2002/0199104 A1 * | 12/2002 | Kakemizu | H04L 63/08 713/168 |
| 2003/0009456 A1 * | 1/2003 | Shintani et al. | 707/6 |
| 2003/0023593 A1 * | 1/2003 | Schmidt | G06F 17/30539 707/999.006 |
| 2003/0187992 A1 * | 10/2003 | Steenfeldt | H04L 29/06 709/227 |
| 2004/0176966 A1 * | 9/2004 | Chen | 705/1 |
| 2006/0036538 A1 * | 2/2006 | Griffis | G06Q 20/10 705/39 |
| 2009/0012919 A1 * | 1/2009 | Crivat et al. | 706/12 |

(Continued)

OTHER PUBLICATIONS

English Abstract for Japanese Application Publication No. 2013164730; Ochiai, Toshiko; Aug. 22, 2013.*

(Continued)

*Primary Examiner* — Ashish K Thomas
*Assistant Examiner* — Jedidiah Ferrer
(74) *Attorney, Agent, or Firm* — FisherBroyles LLP (57) ABSTRACT

A computer-implemented method for mining data in a data warehouse may include (1) identifying a parent table in a data warehouse, (2) identifying a child table in the data warehouse that depends from the parent table, (3) generating a rule family including rules based on the parent table and the child table, each of the rules in the rule family correlating a potential value of a field of the parent table with a potential value of a field of the child table, (4) determining a level of support for each rule in the rule family, and (5) evaluating quality of incoming data according to a rule in the rule family based on the determined level of support for the rule. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2010/0161602 A1* | 6/2010 | Caceres | | 707/736 |
| 2011/0153664 A1* | 6/2011 | Lang et al. | | 707/776 |
| 2011/0238637 A1* | 9/2011 | Morozov | G06F 17/30578 | 707/694 |
| 2012/0310874 A1* | 12/2012 | Dantressangle et al. | | 707/600 |
| 2013/0013640 A1* | 1/2013 | Dong | G06F 17/30592 | 707/777 |
| 2013/0080368 A1* | 3/2013 | Nandy | | 706/47 |
| 2013/0117217 A1* | 5/2013 | Bhide et al. | | 707/602 |

OTHER PUBLICATIONS

Wikipedia; Data Warehouse; http://en.wikipedia.org/w/index.php?title=File:Data_warehouse_overview.JPG; as accessed on Jun. 29, 2013.

Wikipedia; Snowflake Schema; http://en.wikipedia.org/w/index.php?oldid=555382930; as accessed on Jun. 29, 2013.

Wikipedia; Star Schema; http://en.wikipedia.org/w/index.php?oldid=568568876; as accessed on Jun. 29, 2013.

David L. Olson et al.; Mining Fuzzy Weighted Association Rules; Proceedings of the 40th Hawaii International Conference on System Sciences—2007; as accessed on Jun. 29, 2013.

* cited by examiner

SYSTEMS AND METHODS FOR MINING DATA IN A DATA WAREHOUSE

BACKGROUND

Individuals and organizations often store data within data warehouses that act as central repositories for data from a variety of different data sources. Due to their scale, data warehouses may facilitate the analysis and identification of trends over time —a technique known as "data mining." To facilitate data mining, data warehouses may store data within a hierarchy of specialized tables, such as fact tables and dimension tables. Fact tables may include information about explicit measurements, such as the price of a sale. Dimension tables, in contrast, may depend from fact tables (or other dimension tables) and include attribute information about entities related to the fact tables.

Unfortunately, hackers, criminals, or fraudsters often generate fake, simulated, or fraudulent data. As such, administrators may wish to evaluate the quality of new or incoming data to prevent low quality or simulated data from being stored within data warehouses. However, conventional methods for detecting low quality or simulated data may require manual intervention and/or suffer from excessive delay or accuracy issues. These conventional methods may also fail to leverage or account for attribute information in dimension tables and/or fail to select or consider the best or most appropriate method for evaluating incoming data when multiple methods are available.

Accordingly, the instant disclosure identifies and addresses a need for additional and improved systems and methods for mining data in a data warehouse.

SUMMARY

As will be described in greater detail below, the instant disclosure generally relates to systems and methods for mining data in a data warehouse by generating a rule family, determining how well the underlying data in the data warehouse supports the rules in the rule family, and then evaluating incoming data using one of the rules based on a level of support associated with the rule. In one example, a computer-implemented method for mining data in a data warehouse may include (1) identifying a parent table in a data warehouse, (2) identifying a child table in the data warehouse that depends from the parent table, (3) generating a rule family that includes rules based on the parent table and the child table, with each of the rules in the rule family correlating a potential value of a field of the parent table with a potential value of a field of the child table, (4) determining a level of support for each rule in the rule family, and (5) evaluating quality of incoming data according to a rule in the rule family based on the determined level of support for the rule.

In one embodiment, the parent table may include a fact table and the child table may include a dimension table. In another embodiment, the parent table may include a dimension table and the child table includes another dimension table.

In some examples, generating the rule family based on the parent table and the child table may include generating a set of permutations of potential values of the field of the parent table and the field of the child table. Additionally, determining the level of support for each rule in the rule family may include sorting the rules according to each level of support for each rule.

In some examples, sorting the rules in the rule family may include performing a heapsort algorithm. Additionally, determining the level of support for each rule in the rule family may include determining a top scoring rule.

In some examples, determining the level of support for each rule in the rule family may include determining a proportion of recorded facts in the data warehouse that match the rule. Additionally, evaluating the quality of incoming data according to the rule in the rule family based on the determined level of support for the rule may include evaluating whether the incoming data matches the rule.

In one embodiment, the data warehouse stores data using a star schema and/or a snowflake schema. Additionally, each rule in the rule family may include the same potential value in a first node of the rule. In some examples, each rule in the rule family is associated with (1) a rule creation time that indicates when the rule was created, (2) a rule hash that uniquely identifies the hash, (3) a last updated time that indicates when the level of support for the rule was last determined, and/or (4) a time to live value that indicates a remaining survival period for the rule.

In one embodiment, a system for implementing the above-described method may include (1) an identification module that identifies a parent table in a data warehouse and that identifies a child table in the data warehouse that depends from the parent table, (2) a generation module that generates a rule family that includes rules based on the parent table and the child table, with each of the rules in the rule family correlating a potential value of a field of the parent table with a potential value of a field of the child table, (3) a determination module that determines a level of support for each rule in the rule family, (4) an evaluation module that evaluates quality of incoming data according to a rule in the rule family based on the determined level of support for the rule, and (5) at least one processor configured to execute the identification module, the generation module, the determination module, and the evaluation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a parent table in a data warehouse, (2) identify a child table in the data warehouse that depends from the parent table, (3) generate a rule family that includes rules based on the parent table and the child table, with each of the rules in the rule family correlating a potential value of a field of the parent table with a potential value of a field of the child table, (4) determine a level of support for each rule in the rule family, and (5) evaluate quality of incoming data according to a rule in the rule family based on the determined level of support for the rule.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for mining data in a data warehouse. As will be explained in greater detail below, these systems and methods may generate a family of rules, determine how well the underlying data in the data warehouse supports these rules, and then evaluate incoming data using one of the rules based on a level of support associated with the rule. By so doing, the disclosed systems and methods may more accurately and/or efficiently detect low quality or simulated data and/or enable users to continuously identify and/or update the best or most appropriate methods for evaluating incoming data.

Figure 1:
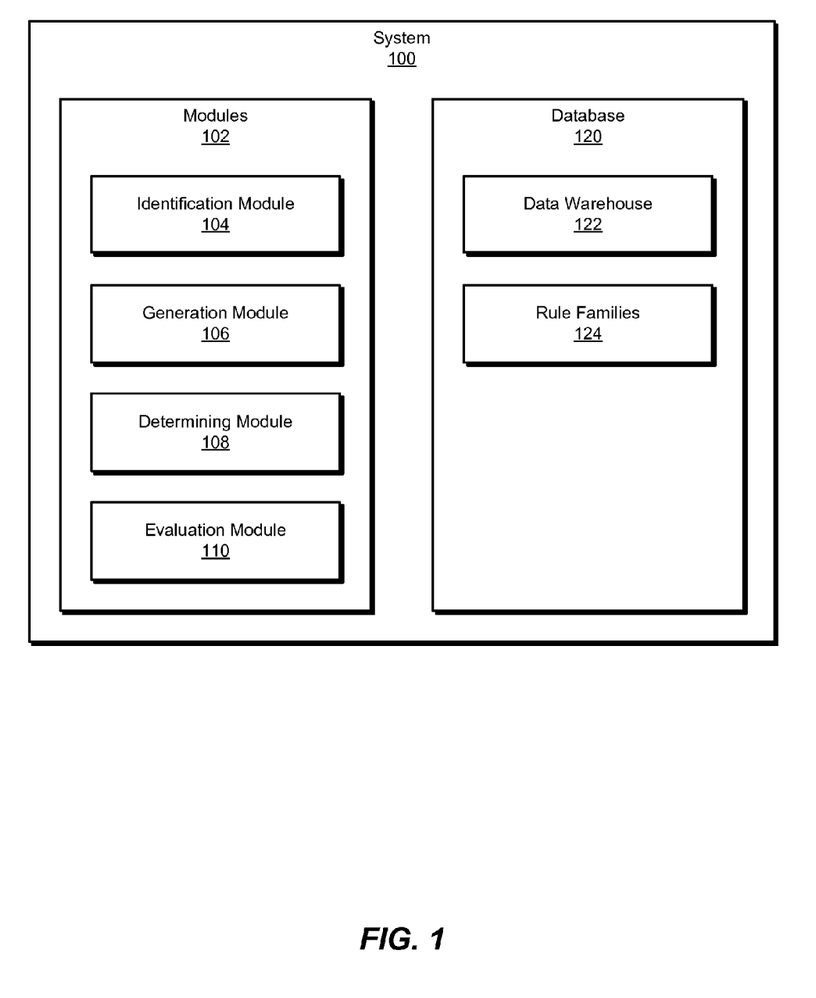
FIG. 1 is a block diagram of an exemplary system for mining data in a data warehouse.
Figure 2:
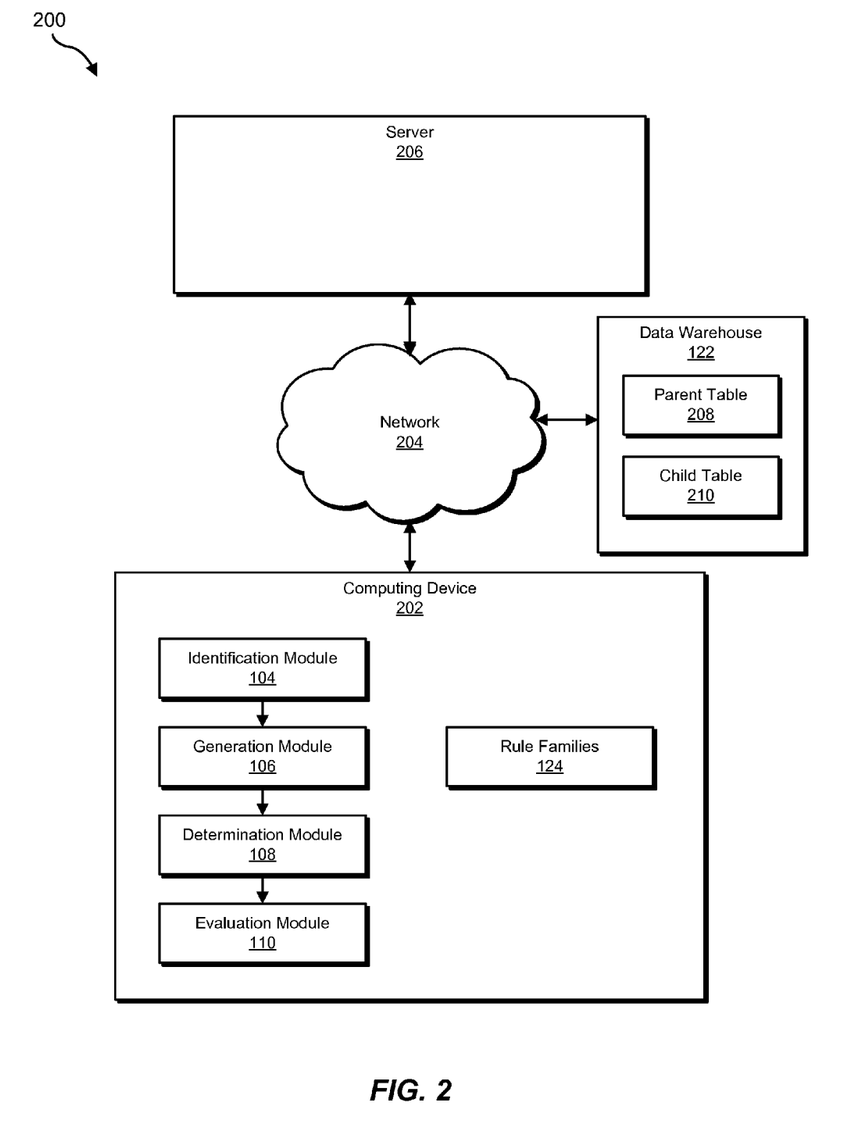
FIG. 2 is a block diagram of an exemplary system for mining data in a data warehouse.

The following will provide, with reference to FIGS. 1-2, detailed descriptions of exemplary systems for mining data in a data warehouse. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for mining data in a data warehouse. As illustrated in this figure, exemplary system 100 may include one or more modules 102 for performing one or more tasks. For example, and as will be explained in greater detail below, exemplary system 100 may include an identification module 104 that may identify a parent table in a data warehouse. Identification module 104 may also identify a child table in the data warehouse that depends from the parent table. Exemplary system 100 may additionally include a generation module 106 that may generate a rule family based on the parent table and the child table. In this example, each of the rules in the rule family may correlate a potential value of a field of the parent table with a potential value of a field of the child table.

Exemplary system 100 may also include a determination module 108 that may determine a level of support for each rule in the rule family. In addition, exemplary system 100 may include an evaluation module 110 that may evaluate quality of incoming data according to a rule in the rule family based on the determined level of support for the rule. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a data warehouse 122. Data warehouse 122 may store data using any of a variety of schemas, such as a star schema and/or a snowflake schema. Database 120 may also store a set of rule families 124. As discussed further below, evaluation module 110 may evaluate incoming data using one or more of the rules in rule families 124.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store and/or manage all or a portion of the data in database 120. Additionally or alternatively, server 206 may be programmed with one or more of modules 102 and/or may store and/or manage all or a portion of the data in database 120.

In the example of FIG. 2, server 206 may manage and/or interface with data warehouse 122. Data warehouse 122 may store data in separate tables, such as a parent table 208 and a child table 210 that depends from parent table 208. Server 206, which may represent a corporate or enterprise server, may log data about transactions, events, purchases, and/or entities. Server 206 may then provide this data to data warehouse 122 for storage and management.

Computing device 202 may include a client-side device for evaluating the quality of data within data warehouse 122. Although shown as separate elements in FIG. 2, computing device 202, server 206, and/or data warehouse 122 may be merged into one or more separate computing systems. In some examples, and as will be described in greater detail below, computing device 202 may manage the rules in rule families 124, which may be stored within computing device 202 (as in FIG. 2), server 206, or elsewhere. Computing device 202 may evaluate the rules themselves, rank or sort them, and then use the evaluated rules to further evaluate the quality of data that is incoming to data warehouse 122 (i.e., incoming from server 206).

In one embodiment, one or more of modules 102 from FIG. 1 may, when executed by at least one processor of computing device 202 and/or server 206, cause computing device 202 and/or server 206 to mine data in data warehouse 122. For example, and as will be described in greater detail below, identification module 104 may be programmed to identify a parent table, such as parent table 208, in data warehouse 122. Identification module 104 may also be programmed to identify a child table, such as child table 210, in data warehouse 122 that depends from the parent table. In addition, generation module 106 may be programmed to generate a rule family (stored in rule families 124) that includes rules based on parent table 208 and child table 210, with each of the rules in the rule family correlating a potential value of a field of parent table 208 with a potential value of a field of child table 210. Determination module 108 may then be programmed to determine a level of support for each rule in the rule family. Finally, evaluation module 110 may be programmed to evaluate the quality of incoming data according to a rule in the rule family based on the determined level of support for the rule.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of managing data warehouse 122 and/or transmitting data to data warehouse 122 for storage. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
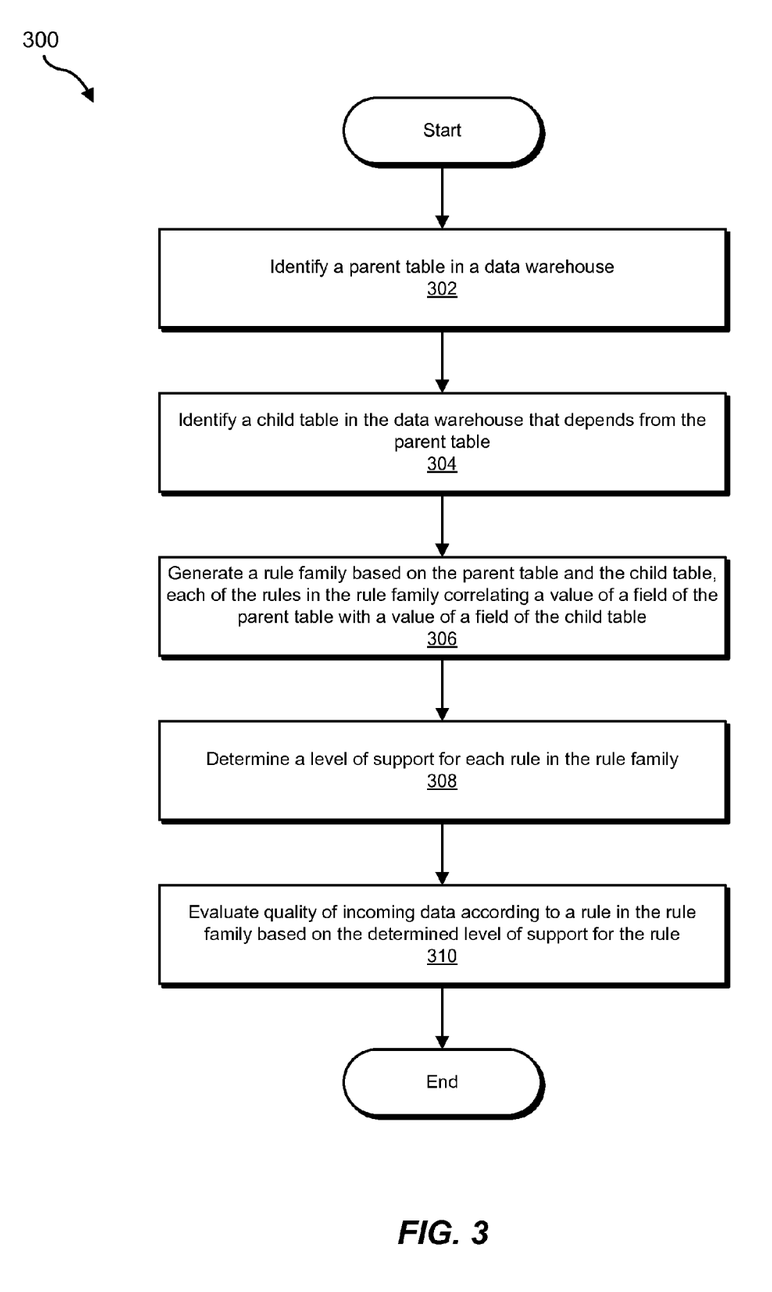
FIG. 3 is a flow diagram of an exemplary method for mining data in a data warehouse.

FIG. 3 is a flow diagram of an exemplary computer-implemented method 300 for mining data in a data warehouse. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a parent table in a data warehouse. For example, identification module 104 may, as part of computing device 202 in FIG. 2, identify parent table 208 in data warehouse 122.

As herein, the term "data warehouse" generally refers to any database that stores data from different sources within in a centralized repository, according to a hierarchy of tables, for one or more individuals or organizations. Moreover, as used herein, the term "parent table" generally refers to any table in a data warehouse from which another table depends. Parent tables may take a variety of forms, such as fact tables and/or dimension tables. Whether the parent table includes a fact table or a dimension table, the parent table may serve as a parent from which a dimension table depends, either directly or indirectly.

The data stored in the data warehouse that contains the parent table identified in step 302 may be organized according to a variety of schemas, such as a star schema and/or a snowflake schema. In some examples, a fact table may be located at the center of this schema. This fact table may be surrounded by dimension tables and may include two types of fields: fields that contain facts and fields that contain keys to dimension tables. The fact table may also include a primary key that corresponds to a composite key formed by all of the keys to the dimension tables. In some examples, fact tables may store the direct measurements that form the contents of data warehouse 122, while dimension tables may describe incidental attributes about those measurements. These fact tables may also provide values that act as independent variables by which dimensional attributes may be analyzed. In some embodiments, fact tables may be defined by their grain, which may represent the most atomic level by which the facts may be defined.

Figure 4:
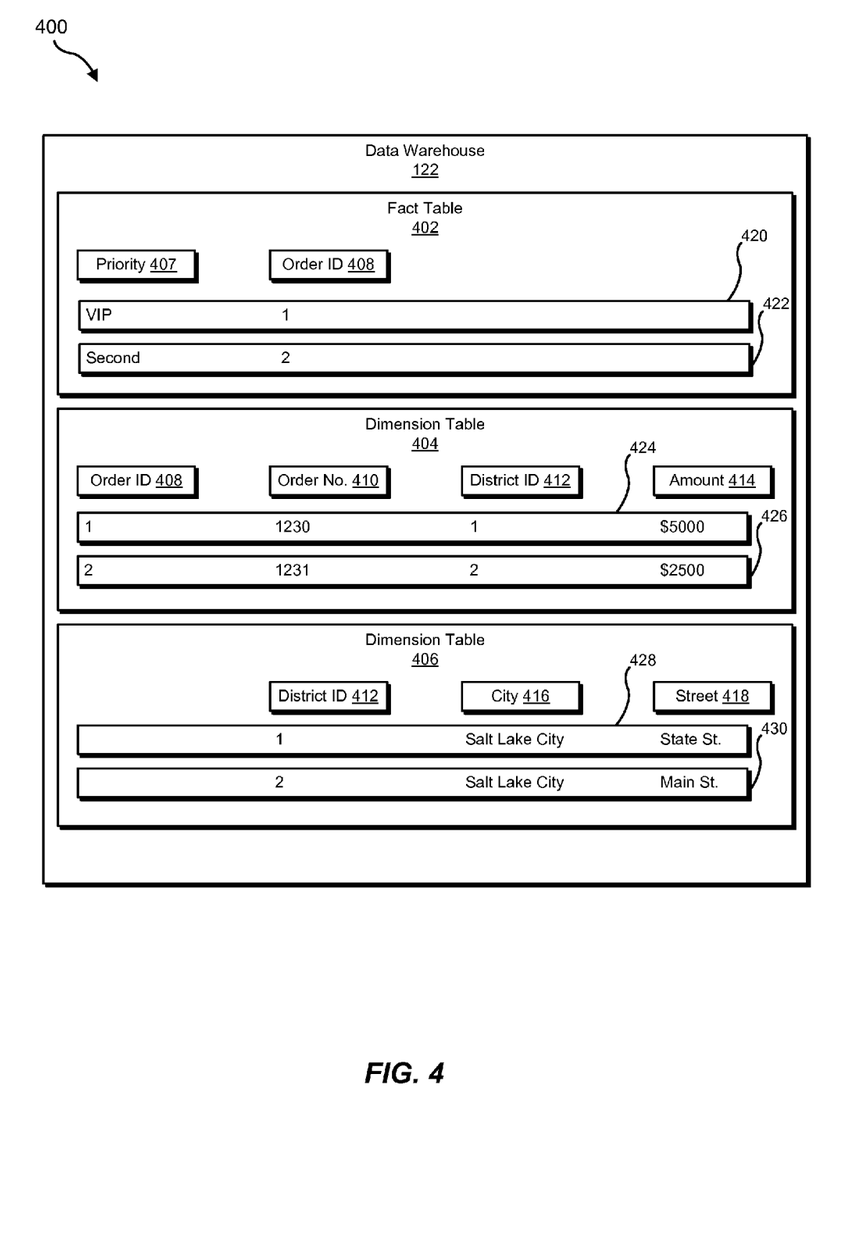
FIG. 4 is a block diagram of an exemplary fact table and dimension tables.

FIG. 4 shows an exemplary parent table and child table in data warehouse 122. In this example, fact table 402 may represent a parent table and dimension table 404 (which depends from fact table 402) may represent a child table of fact table 402. Data warehouse 122 may also store a dimension table 406 that depends from dimension table 404. Dimension table 406 may, therefore, also constitute a child table of both dimension table 404 and (indirectly) fact table 402.

As shown in FIG. 4, data warehouse 122 may store data according to fact table 402 to record a priority of packages shipped from a retailer, such as WALMART. Specifically, data warehouse 122 may define fact table 402 in terms of two fields: a priority 407 and an order ID 408. Priority 407 may indicate a level of priority for a package, such as VIP (i.e., top) priority, secondary priority, and no priority. Order ID 408 may provide an internal data warehouse identifier that identifies a specific order for a package. In this example, order ID 408 may serve as a key to dimension table 404, which may also contain the same field. Similarly, dimension table 404 may also contain the following fields: an order number 410 that indicates the retailer order number for the package, a district ID 412 that indicates a destination district for the package, and an amount 414 that indicates a dollar amount for sale of the package from the retailer.

In one example, dimension table 406 may directly depend from dimension table 404 in a parent-child relationship. Dimension table 406 may also indirectly depend from fact table 402 in a parent-child relationship. Moreover, dimension table 406 may include the following fields: district ID 412 (which may serve as a key for dimension table 404 to dimension table 406), city 416, and street 418. District ID 412 may identify a geographic district (e.g., one defined by the retailer shipping packages, or one defined by local government) where the package is directed. City 416 and street 418 may indicate destination cities and streets for packages, respectively. For ease of discussion, FIG. 4 also shows records 420, 422, 424, 426, 428, and 430. Records 420 and 422 may refer to two separate order IDs (i.e., packages), which have VIP and second priority, respectively.

Identification module 104 may identify the parent table in data warehouse 122 in a variety of ways. In some examples, identification module 104 may identify the parent table, such as fact table 402, in part by identifying a parent-child relationship between the parent table and a child table. Identification module 104 may also identify header information and/or metadata information that identifies the parent table as a parent table. For example, identification module 104 may identify within the parent table a key to a dimension table. Identification module 104 may identify some, all, or substantially all parent tables, fact tables, child tables, dimension tables, and/or parent-child relationships between parent tables and child tables, within data warehouse 122 and/or a proper subset of data warehouse 122. For example, identification module may parse, crawl, and/or systemically query data warehouse 122, or a proper subset of data warehouse 122, to identify one or more of these tables and relationships.

Returning to FIG. 3, at step 304 one or more of the systems described herein may identify a child table in the data warehouse that depends from the parent table. For example, identification module 104 may, as part of computing device 202 in FIG. 2, identify a child table 210 in data warehouse 122 that depends from parent table 208.

Identification module 104 may identify the child table in a variety of ways. In general, identification module 104 may identify the child table in ways that parallel the ways that identification module 104 identified the parent table, as discussed above for step 302. In one example, identification module 104 may identify the child table in part by identifying the parent-child relationship between the child table and the parent table. For example, identification module 104 may identify a key or identifier in a fact table or dimension table that corresponds, or points, to the child table (i.e., a dimension table).

In the example of FIG. 4, identification module 104 may identify dimension table 404 and/or dimension table 406 as a child table in a parent-child relationship with fact table 402. Identification module 104 may also identify dimension table 406 as a child table in a parent-child relationship with dimension table 404. Identification module 104 may perform these identifications using various fields, such as order ID 408 and/or district ID 412, as keys to respective dimension tables.

At step 306, one or more of the systems described herein may generate a rule family that includes a plurality of rules based on the parent table and the child table, with each of the rules in the rule family correlating a potential value of a field of the parent table with a potential value of a field of the child table. For example, generation module 106 may, as part of computing device 202 in FIG. 2, generate a rule family, within rule families 124, including a plurality of rules based on parent table 208 and child table 210.

As used herein, the term "potential value" may refer to any value that a field in a database or data warehouse may take, in a way parallel to the way that a mathematical variable may take a range of different values. For example, an integer can take potential values of 1, 2, 3, etc.

Generation module 106 may generate the rule family in a variety of ways. In some examples, generation module 106 generates the rule family in part by generating a set of permutations of potential values of the field of the parent table and the field of the child table. For example, priority 407 in FIG. 4 may take potential values of VIP, second, and no priority. Similarly, street 418 in FIG. 4 may take potential values of State St. and Main St. Generation module 106 may generate the rule family in part by generating a set of permutations of potential values for priority 407 and street 418.

Figure 5:
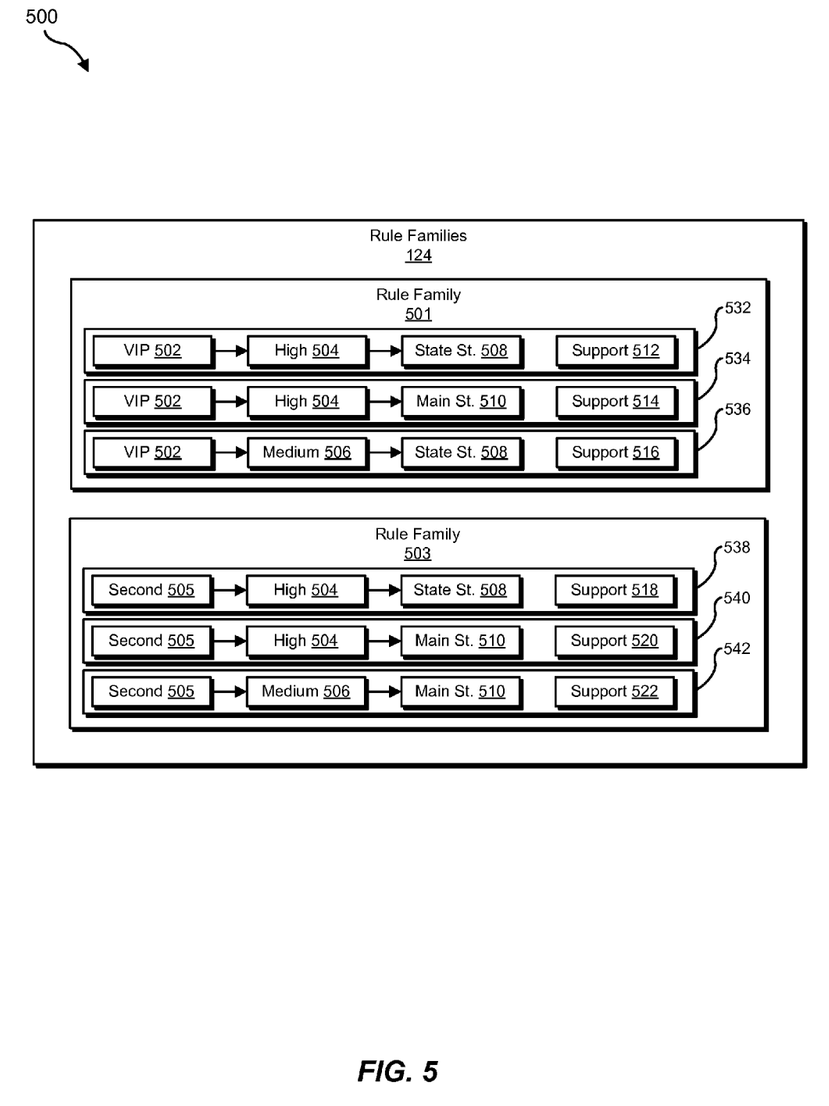
FIG. 5 is a block diagram of exemplary rule families.

FIG. 5 shows an exemplary pair of rule families 501 and 503 within rule families 124. Rule families 501 and 503 may contain respective rules 532, 534, 536, 538, 540, and 542. The rules in rule families 501 and 503 may contain permutations of street 418, in the form of potential values State St. 508 and Main St. 510, as discussed above. In the example of FIG. 5, each rule in the rule family may include the same potential value in a first node of the rule. For example, generation module 106 may define each rule family by a potential value of priority 407 in fact table 402, which may constitute a measurement field (as opposed to a key to a dimension table) of a parent table or fact table. Generation module 106 may define rule family 501 by a potential value of VIP 502 and define rule family 503 by a potential value of second 505. While the examples in FIG. 5 show an incomplete set of permutations, generation module 106 may generate all, some, or substantially all permutations of potential values of one or more fields within data warehouse 122.

In one example, generation module 106 may generate the rule family in part by categorizing potential values of a field within two or more sub-ranges for the field. For example, generation module 106 may categorize potential values of the field of amount 414 in FIG. 4 into sub-ranges of high ($4000+), medium ($2000-$3999), and low ($0-$1999). Generation module 106 may then correlate potential values of a field with potential values of another field in part by correlating a sub-range category, in which the potential fall falls, with a potential value of a different field (or with a sub-range category in which the other potential value falls). In other words, the term "potential value," as used herein, may also refer to a categorized sub-range within which a more specific value falls. In the example of FIG. 5, generation module may correlate high 504 purchases (i.e., those falling within the sub-range $4000+) with VIP 502 and State St. 508 in a rule 532.

In another example, generation module 106 may generate the rule family in part by receiving human input that defines part or all of the rule family. Generation module 106 may also generate the rule family in part by identifying candidate rules and then confirming or disconfirming one or more candidate rules as rule family members (e.g., based on approval or disapproval by a human user).

Additionally or alternatively, generation module 106 may generate the rule family in part by identifying correlations between potential values of at least two potentials values of two fields that occur at a higher frequency than other correlations between different potential values within a set of data. This set of data may constitute all or a subset of the data within data warehouse 122 (e.g., a representative or random sample of data). Generation module 106 may also generate the rule family in part by generating rules that include the identified higher-frequency correlations and also include permutations of potential values of a third field (or more than three fields). Furthermore, generation module 106 may generate the rule family in part by generating rules that correlate potential values from three different fields, with each field being located at a different hierarchical height within a hierarchy of fact tables and dimension tables (e.g., a fact table, a dimension table depending from the fact table, and a further dimension table depending from the first dimension table, occur at hierarchical heights of degree one, two, and three, respectively, as shown in FIG. 4).

In one embodiment, each rule in the rule family is associated with one or more of the following: (1) a rule creation time that indicates when the rule was created, (2) a rule hash that uniquely identifies the hash (as further discussed below), (3) a last updated time that indicates when a level of support for the rule was last determined, and/or (4) a time to live value that indicates a remaining survival period for the rule. If a rule is associated with a time to live value, this time to live value may have an initial value of full "time to live." Generation module 106, determination module 108, and/or evaluation module 110 may then decrement this time to live value if no recorded fact fits the rule having the time to live value during a data transaction.

In another embodiment, generation module 106 may generate the rule family in part by introducing a member to the family. In this embodiment, generation module 106 may condition adding the new rule to the rule family on the new rule having a different rule hash and/or time to live value than all other rules in the rule family.

Generation module 106, determination module 108, and/or evaluation module 110 may also eliminate a rule from the rule family if the time to live value for the rule reaches a time to live threshold value, which may be predetermined. Additionally or alternatively, generation module 106, determination module 108, and/or evaluation module 110 may also eliminate a rule from the rule family if a calculated level of support (as discussed in detail below in connection with step 308) reaches a support threshold value, which may be predetermined.

At step 308, one or more of the systems described herein may determine a level of support for each rule in the rule family. For example, determination module 108 may, as part of computing device 202 in FIG. 2, determine a level of support for each rule in the rule family.

Determination module 108 may determine a level of support for each rule in the rule family in a variety of ways. As shown in FIG. 5, determination module 108 may assign each rule in rule family 501 and rule family 503 a level of support 512, 514, 516, 518, 520, and 522, respectively. In general, determination module 108 may determine an extent to which data (e.g., all, some, or substantially all data) within data warehouse 122 supports the rule. A human user and/or determination module 108 autonomously may identify the set of data (or the entirety of data) within data warehouse 122 to use for calculating the level of support. In some examples, determination module 108 may determine the level of support for each rule in the rule family in part by determining a proportion of recorded facts in the data warehouse that match the rule. More generally, determination module 108 may determine a number or proportion of recorded facts that match the rule to a perfect or imperfect degree. Determination module 108 may also determine a degree of fit or match between each recorded fact within a set of data and the rule. Determination module 108 may then calculate an average, median, aggregate, and/or representative degree of fit for the set of data overall, based on the individually computed degrees of fit. For example, a recorded fact of a purchase of an order of $3,999 may not perfectly match a rule that has a potential value of $4000+. Nevertheless, the recorded fact may have a closer degree of fit to the rule than a recorded fact of a purchase for $5, because $3,999 is much closer to $4,000 than $5.

In some examples, determination module 108 may determine the level of support for each rule in the rule family in part by sorting the rules according to each level of support for each rule. In one illustrative example, determination module 108 may calculate a degree of support along a scale from 1 to 10, with 1 indicating a lowest degree of support and 10 indicating a highest degree of support (in absolute or relative terms in comparison to other rules). Determination module may then sort the rules so that more highly supported rules are ordered above (or below) less supported rules within a sorted array of rules. In some examples, determination module 108 may sort the rules in the rule family in part by performing a heapsort algorithm. In the same or different examples, determination module 108 may determine the level of support for each rule in the rule family in part by determining a top scoring rule.

Determination module 108 may also promote a rule within the rule family if the rule receives a higher level of support than the rule previously received. In some examples, determination module 108 may update the support level for the rule when the rule matches an incoming recorded fact, as discussed further for step 310. If the rule matches an incoming recorded fact, determination module 108 may set a flag to notify a time to live counter that manages the time to live value for the rule.

Determination module 108 and/or generation module 106 may also merge rules into a single new rule if the rules satisfy one or more of the following conditions. A first condition is that the support level for each rule satisfy a closeness or similarity threshold, which may be predetermined. A second condition is that the time to live values for each rule both satisfy a closeness or similarity threshold to the full time to live value, as mentioned above. A third condition is that an active time for both rules have a degree of overlap. Determination module 108 may require the degree of overlap to achieve a threshold, which may be predetermined.

At step 310, one or more of the systems described herein may evaluate quality of incoming data according to a rule in the rule family based on the determined level of support for the rule. For example, evaluation module 110 may, as part of computing device 202 in FIG. 2, evaluate quality of incoming data according to a rule in the rule family based on the determined level of support for the rule.

Evaluation module 110 may evaluate quality of incoming data in a variety of ways. In some examples, evaluation module 110 may evaluate quality of incoming data according to the rule in the rule family based on the determined level of support for the rule in part by evaluating whether the incoming data matches the rule. Incoming data may match the rule perfectly or imperfectly. Incoming data that matches the rule imperfectly may satisfy a threshold of fit or match between the incoming data and the rule, as further discussed above. In some examples, evaluation module 110 may evaluate quality of incoming data according to the rule in the rule family based on the determined level of support for the rule in part by evaluating whether the incoming data matches the top scoring rule. In further examples, evaluation module 110 may evaluate quality of incoming data in part by selecting a rule based on the rule having a higher degree of support than another rule or rules. Evaluation module 110 may also apply the rules and weight the results of applying the rules based on the degree of support for the rule. Evaluation module 110 may perform this weighting for each of multiple applied rules (e.g., so that a higher scoring rules is weighted more heavily).

In the example of FIG. 4, recorded facts may include a VIP order for a first order, having an order ID 408 value of 1, for an amount of $5,000. Records facts may also include a second priority order, having an order ID 408 value of 2, for an amount of $2,500. As shown in FIG. 5, the VIP order may match rule 532 and no other rule in rule families 501 and 503. Similarly, the second priority order in FIG. 4 may match rule 542 and no other rule in rule families 501 and 503. Accordingly, determination module 108 may assign rules 532 and 542 higher levels of support than other rules. Similarly, evaluation module 110 may evaluate incoming data using rules 532 and 542 more frequently and/or intensively (e.g., with applying greater weights to results of applying the rules) based on those rules having higher levels of support than other rules. Evaluation module 110 may evaluate incoming data as having higher quality to an extent that the data matches, perfectly or imperfectly (e.g., having a degree of fit), rules that have higher levels of support. Conversely, evaluation module 110 may evaluate incoming data as having lower quality to an extent that the data does not match rules having higher levels of support, or matches rules that have no or lower levels support.

Upon completion of step 310, the process flow of exemplary method 300 in FIG. 3 may terminate.

The following provides a high-level overview of the systems and methods described herein. As detailed above, in data warehousing, databases may partition transaction data into facts and dimensions, which may represent tables of different levels. For example, fact tables may be located at a top level above dimension tables, and dimension tables may be broken into different levels. Data fields or columns from both facts and dimensions may define attributes. Each field or attribute may have more than one facet or value, while facets may not be correlated in some cases. Attribute facets may represent a number, range, category, or any user-defined object.

In some examples, the systems and methods described herein may use data attribute correlation to operate on the fact and dimension tables within a database. Specifically, the disclosed systems and methods may correlate different columns of data by their attribute facets. As such, these systems and methods may link different data attributes from different levels of columns as a rule, which may be uniquely owned by a rule family as a family member. The systems and methods described herein may define the rule family by the first node of the rule or an attribute facet from a fact column (which could be null if the fact column does not exist). The disclosed systems and methods may then select the top rule member as the family representative rule to identify incoming data stream after the rule family training time.

In sum, and as explained above in connection with method 300 in FIG. 3, the systems and methods described herein may generate a family of rules, determine how well the underlying data in the data warehouse supports these rules, and then evaluate incoming data using one of the rules based on a level of support associated with the rule. By so doing, the disclosed systems and methods may more accurately and/or efficiently detect low quality or simulated data and/or enable users to continuously identify and/or update the best or most appropriate methods for evaluating incoming data.

Figure 6:
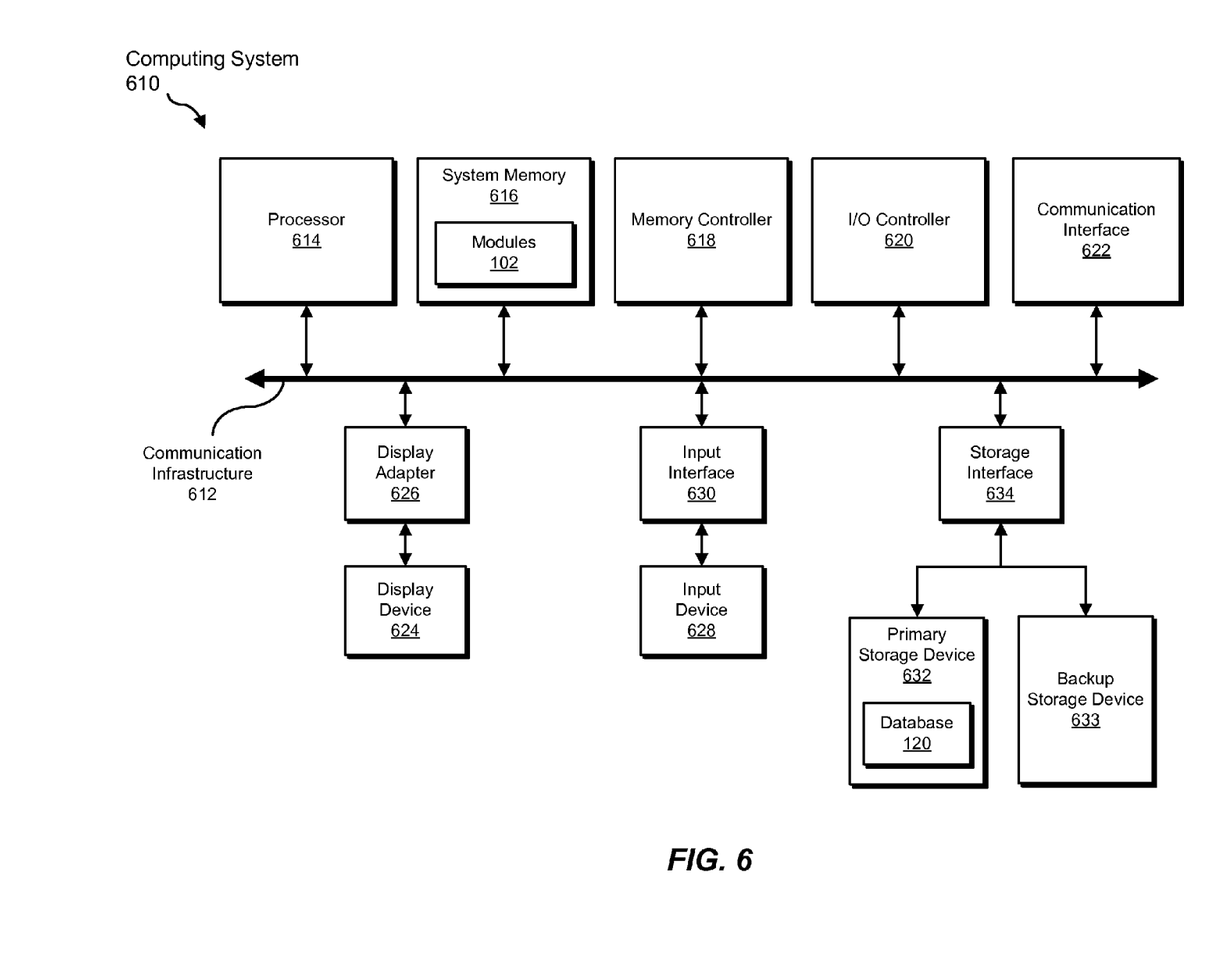
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
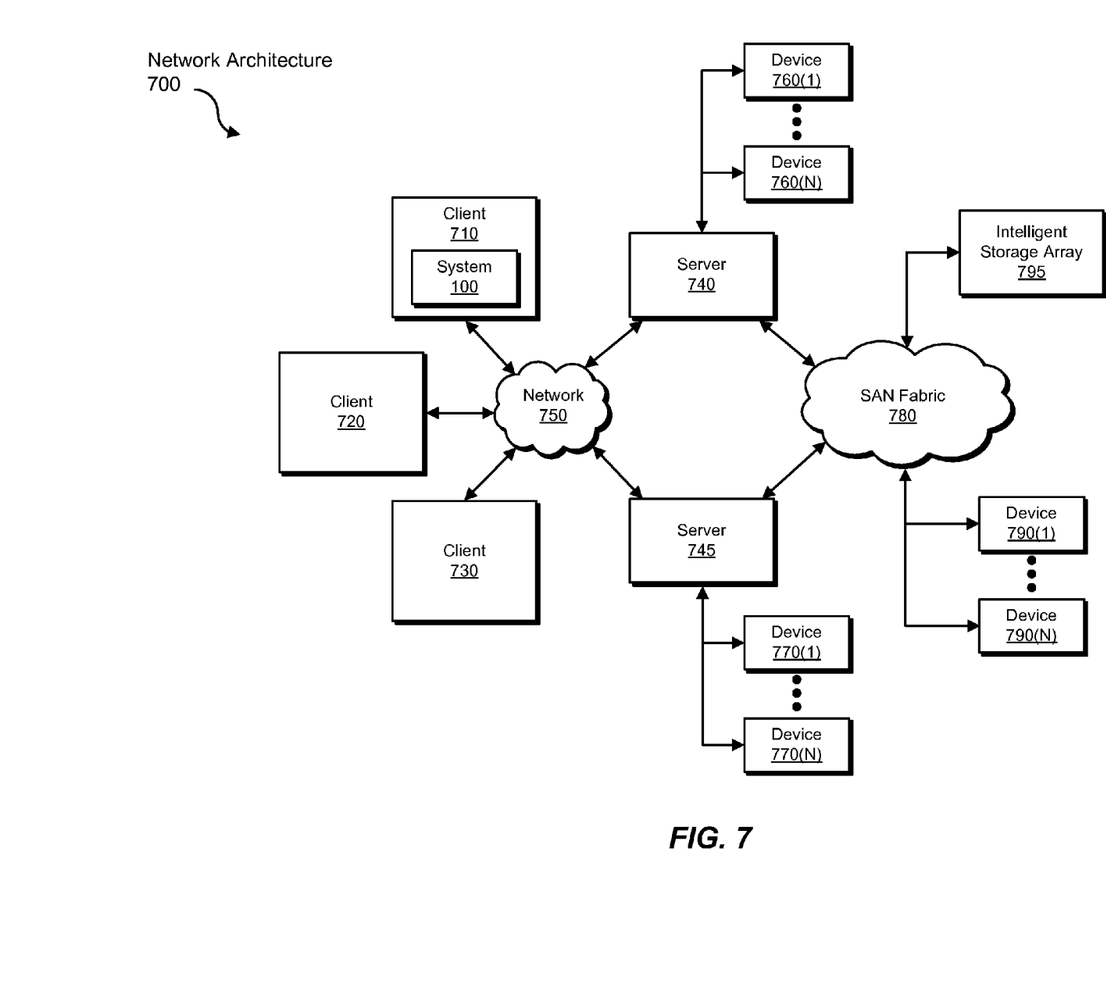
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for mining data in a data warehouse.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive, at a server and/or data warehouse, transaction, input, and/or rule data to be transformed, transform the data into a rule family, rule member, and/or level of support for one or more rules, output a result of the transformation to generation module, determination module, evaluation module, and/or output device or display, use the result of the transformation to determine a level of support for a rule and/or evaluate incoming data using one or more rules based on a determined level of support for the rule, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for mining data in a data warehouse, at least a portion of the method being performed by a computing device comprising at least one processor, the method comprising:
   identifying a parent table in a data warehouse;
   identifying a child table in the data warehouse that depends from the parent table, the parent table comprising a fact table that stores sales transaction data and the child table comprising a dimension table including an additional field other than fields included in the parent table, the additional field describing an attribute that is incidental to a value specified in the parent table;
   generating a rule family comprising a plurality of rules based on the parent table and the child table, where each of the rules in the rule family links a potential value of a field of the fact table with a potential value of the additional field of the dimension table;
   eliminating an expired rule from the rule family based on a determination that a time to live value indicating a remaining survival period for the expired rule has been decremented from an initial value to a time to live threshold value;
   determining a numerical level of support for each rule in the rule family; and evaluating quality of incoming data according to a rule in the rule family based on the numerical level of support for the rule to detect whether the incoming data is fraudulent.

2. The computer-implemented method of claim 1, wherein the sales transaction data indicates a price of a sale.

3. The computer-implemented method of claim 1, wherein the remaining survival period was decremented based on a determination that no recorded fact fits the expired rule.

4. The computer-implemented method of claim 1, wherein generating the rule family based on the parent table and the child table comprises generating a set of permutations of potential values of the field of the parent table and the additional field of the child table.

5. The computer-implemented method of claim 1, wherein determining the numerical level of support for each rule in the rule family comprises sorting the rules according to each level of support for each rule.

6. The computer-implemented method of claim 5, wherein sorting the rules in the rule family comprises performing a heapsort algorithm.

7. The computer-implemented method of claim 1, wherein determining the numerical level of support for each rule in the rule family comprises determining a top scoring rule.

8. The computer-implemented method of claim 1, wherein determining the numerical level of support for each rule in the rule family comprises determining a proportion of recorded facts in the data warehouse that match the rule.

9. The computer-implemented method of claim 1, wherein evaluating quality of incoming data according to the rule in the rule family based on the numerical level of support for the rule comprises evaluating whether the incoming data matches the rule.

10. The computer-implemented method of claim 1, wherein the data warehouse stores data in at least one of:
a star schema; and
a snowflake schema.

11. The computer-implemented method of claim 1, wherein each rule in the rule family comprises a same potential value in a first node of the rule.

12. The computer-implemented method of claim 1, wherein each rule in the rule family is associated with at least one of:
a rule creation time that indicates when the rule was created;
a rule hash that uniquely identifies the rule;
a last updated time that indicates when the numerical level of support for the rule was last determined; and
a time to live value that indicates a remaining survival period for the rule.

13. A system for mining data in a data warehouse, the system comprising:
an identification module that:
identifies a parent table in a data warehouse; and
identifies a child table in the data warehouse that depends from the parent table, the parent table comprising a fact table that stores sales transaction data and the child table comprising a dimension table including an additional field other than fields included in the parent table, the additional field describing an attribute that is incidental to a value specified in the parent table;
a generation module that:
generates a rule family comprising a plurality of rules based on the parent table and the child table, where each of the rules in the rule family links a potential value of a field of the fact table with a potential value of the additional field of the dimension table; and
eliminates an expired rule from the rule family based on a determination that a time to live value indicating a remaining survival period for the expired rule has been decremented from an initial value to a time to live threshold value;
a determination module that determines a numerical level of support for each rule in the rule family;
an evaluation module that evaluates quality of incoming data according to a rule in the rule family based on the numerical level of support for the rule to detect whether the incoming data is fraudulent; and
at least one processor configured to execute the identification module, the generation module, the determination module, and the evaluation module.

14. The system of claim 13, wherein the sales transaction data indicates a price of a sale.

15. The system of claim 13, wherein the remaining survival period was decremented based on a determination that no recorded fact fits the expired rule.

16. The system of claim 13, wherein the generation module generates the rule family based on the parent table and the child table by generating a set of permutations of potential values of the field of the parent table and the additional field of the child table.

17. The system of claim 13, wherein the determination module determines the numerical level of support for each rule in the rule family by sorting the rules according to each level of support for each rule.

18. The system of claim 17, wherein the determination module sorts the rules in the rule family by performing a heapsort algorithm.

19. The system of claim 13, wherein the determination module determines the numerical level of support for each rule in the rule family by determining a top scoring rule.

20. A non-transitory computer-readable-storage medium comprising one or more computer-readable instructions that, when executed by at least one processor of a computing device, cause the computing device to:
identify a parent table in a data warehouse;
identify a child table in the data warehouse that depends from the parent table, the parent table comprising a fact table that stores sales transaction data and the child table comprising a dimension table including an additional field other than fields included in the parent table, the additional field describing an attribute that is incidental to a value specified in the parent table;
generate a rule family comprising a plurality of rules based on the parent table and the child table, where each of the rules in the rule family links a potential value of a field of the fact table with a potential value of the additional field of the dimension table;
eliminate an expired rule from the rule family based on a determination that a time to live value indicating a remaining survival period for the expired rule has been decremented from an initial value to a time to live threshold value;
determine a numerical level of support for each rule in the rule family; and
evaluate quality of incoming data according to a rule in the rule family based on the numerical level of support for the rule to detect whether the incoming data is fraudulent.

* * * * *